US012627360B2

(12) United States Patent
Yao et al.

(10) Patent No.: US 12,627,360 B2
(45) Date of Patent: May 12, 2026

(54) METHOD AND SYSTEM FOR APPLYING A UNIFIED TRANSMISSION CONFIGURATION INDICATOR (TCI) STATE TO A TARGET SIGNAL

(71) Applicant: ZTE CORPORATION, Shenzhen (CN)

(72) Inventors: Ke Yao, Shenzhen (CN); Shujuan Zhang, Shenzhen (CN); Bo Gao, Shenzhen (CN); Chuangxin Jiang, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 321 days.

(21) Appl. No.: 18/240,071

(22) Filed: Aug. 30, 2023

(65) Prior Publication Data

US 2024/0031111 A1     Jan. 25, 2024

Related U.S. Application Data

(63) Continuation of application No. PCT/CN2021/085367, filed on Apr. 2, 2021.

(51) Int. Cl.
*H04B 7/06* (2006.01)
*H04L 5/00* (2006.01)
*H04W 72/232* (2023.01)

(52) U.S. Cl.
CPC ....... *H04B 7/06968* (2023.05); *H04L 5/0051* (2013.01); *H04L 5/0091* (2013.01); *H04W 72/232* (2023.01)

(58) Field of Classification Search
CPC .... H04B 7/0665; H04B 7/0695; H04B 7/088; H04B 7/063; H04B 7/0639;
(Continued)

(56) References Cited

U.S. PATENT DOCUMENTS

2020/0007208 A1     1/2020  Zhou et al.
2021/0226688 A1*    7/2021  Khoshnevisan ... H04B 7/06964
(Continued)

FOREIGN PATENT DOCUMENTS

CN     108199819 A     6/2018
CN     109150272 A     1/2019
(Continued)

OTHER PUBLICATIONS

Apple Inc., "On Beam Management Enhancement", 3GPP TSG-RAN WG1 Meeting #103-e, R1-2101350, Feb. 5, 2021, e-Meeting (19 pages).
(Continued)

*Primary Examiner* — Andrew Lee
(74) *Attorney, Agent, or Firm* — Foley & Lardner LLP

(57) ABSTRACT

Example implementations include a wireless communication method of receiving, by a wireless communication device from a network, first signaling, wherein the first signaling activates one or more beam state codepoints, each of the one or more beam state codepoints comprises one or more beam states, determining, by the wireless communication device, at least one beam state according to the one or more beam state codepoints, and applying, by the wireless communication device, the at least one beam state to a target transmission.

13 Claims, 5 Drawing Sheets

800

Receive First Signaling that Activates Beam State Codepoint(s) 810

Receive Downlink Control Information (DCI) that Indicates Beam State(s) and Schedules or Activates Downlink Transmission 820

Determine that Demodulation Reference Signal (DMRS) Ports of Target Signals are Quasi Co-Located with Reference Signal(s) (RS) 830

Determine Beam State(s) by Beam State Codepoint(s) 840

Apply Beam State(s) to a Target Transmission 850

Apply Beam State Set to RS Resource or RS Resource Set 860

Receive RS Request Information for X RS Resource Sets 870

Receive Configuration of M RS Resources or Resource Sets for M Possible Beam State(s) 880

Communicate Target Transmission by RS Request Information or Beam State Set 890

(58) Field of Classification Search
CPC . H04B 7/06968; H04L 5/0091; H04L 5/0051; H04W 72/232
See application file for complete search history.

(56) References Cited

U.S. PATENT DOCUMENTS

| | | | | |
|---|---|---|---|---|
| 2023/0027281 A1* | 1/2023 | Sun | H04L 5/001 | |
| 2023/0090424 A1* | 3/2023 | Chung | H04L 1/1671 | |
| | | | | 370/329 |
| 2023/0216625 A1* | 7/2023 | Gao | H04W 72/23 | |
| | | | | 370/228 |
| 2023/0246785 A1* | 8/2023 | Grossmann | H04L 5/0057 | |
| | | | | 370/329 |
| 2023/0291525 A1* | 9/2023 | Zhou | H04B 7/088 | |
| 2023/0345505 A1* | 10/2023 | Guo | H04L 5/0053 | |
| 2024/0008052 A1* | 1/2024 | Matsumura | H04W 80/02 | |
| 2024/0089861 A1* | 3/2024 | Yuan | H04B 7/0639 | |
| 2024/0154664 A1* | 5/2024 | Bhamri | H04L 5/0053 | |
| 2024/0259053 A1* | 8/2024 | Canonne-Velasquez | | |
| | | | H04B 7/022 | |

FOREIGN PATENT DOCUMENTS

| | | |
|---|---|---|
| CN | 110731112 A | 1/2020 |
| WO | WO-2020/258278 A1 | 12/2020 |

OTHER PUBLICATIONS

Ericsson, "Enhancements on Multi-beam Operation", 3GPP TSG-RAN WG1 Meeting #104-e, Tdoc R1-2101313, Feb. 5, 2021, Online (22 pages).

Mediatek Inc., "Enhancement on multi-beam operation" 3GPP TSG RAN WG1 #104-e, R1-2100588, Feb. 5, 2021, e-Meeting (27 pages).

Moderator (Samsung), "Moderator summary for multi-beam enhancement", 3GPP TSG RAN WG1 #104-e, R1-2101185, Feb. 5, 2021, e-Meeting (37 pages).

Moderator (Samsung), "Moderator summary#2 for multi-beam enhancement: Round 1", 3GPP TSG RAN WG1 #104-e, R1-2101856, Feb. 5, 2021, e-Meeting (30 pages).

OPPO, "Enhancements on Multi-Beam Operation", 3GPP TSG RAN WG1 #104-e, R1-2100118, e-Meeting, Feb. 5, 2021 (25 pages).

ZTE, "Enhancements on Multi-beam Operation", 3GPP TSG RAN WG1 Meeting #104-e, R1-2100285, Feb. 5, 2021, e-Meeting (21 pages).

(Moderator) Samsung, "Moderator summary for multi-beam enhancement: proposal categorization" 3GPP TSG RAN WG1 #102-e, R1-2006985, Aug. 28, 2020, e-Meeting (14 pages).

International Search Report and Written Opinion for PCT Appl. No. PCT/CN2021/085367, mailed Jan. 5, 2022 (8 pages).

* cited by examiner

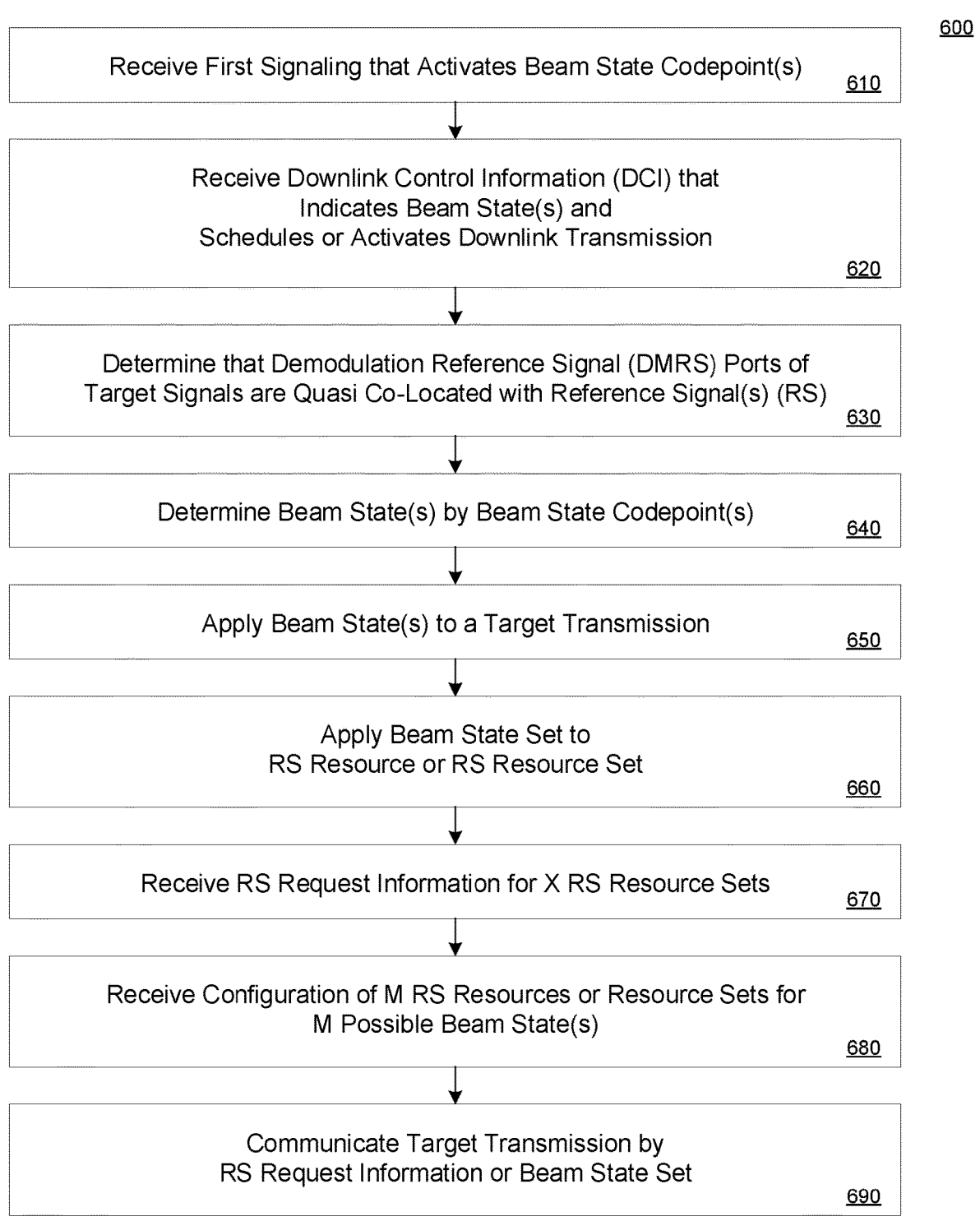

600

Receive First Signaling that Activates Beam State Codepoint(s)    610

Receive Downlink Control Information (DCI) that
Indicates Beam State(s) and
Schedules or Activates Downlink Transmission    620

Determine that Demodulation Reference Signal (DMRS) Ports of
Target Signals are Quasi Co-Located with Reference Signal(s) (RS)    630

Determine Beam State(s) by Beam State Codepoint(s)    640

Apply Beam State(s) to a Target Transmission    650

Apply Beam State Set to
RS Resource or RS Resource Set    660

Receive RS Request Information for X RS Resource Sets    670

Receive Configuration of M RS Resources or Resource Sets for
M Possible Beam State(s)    680

Communicate Target Transmission by
RS Request Information or Beam State Set    690

FIG. 6

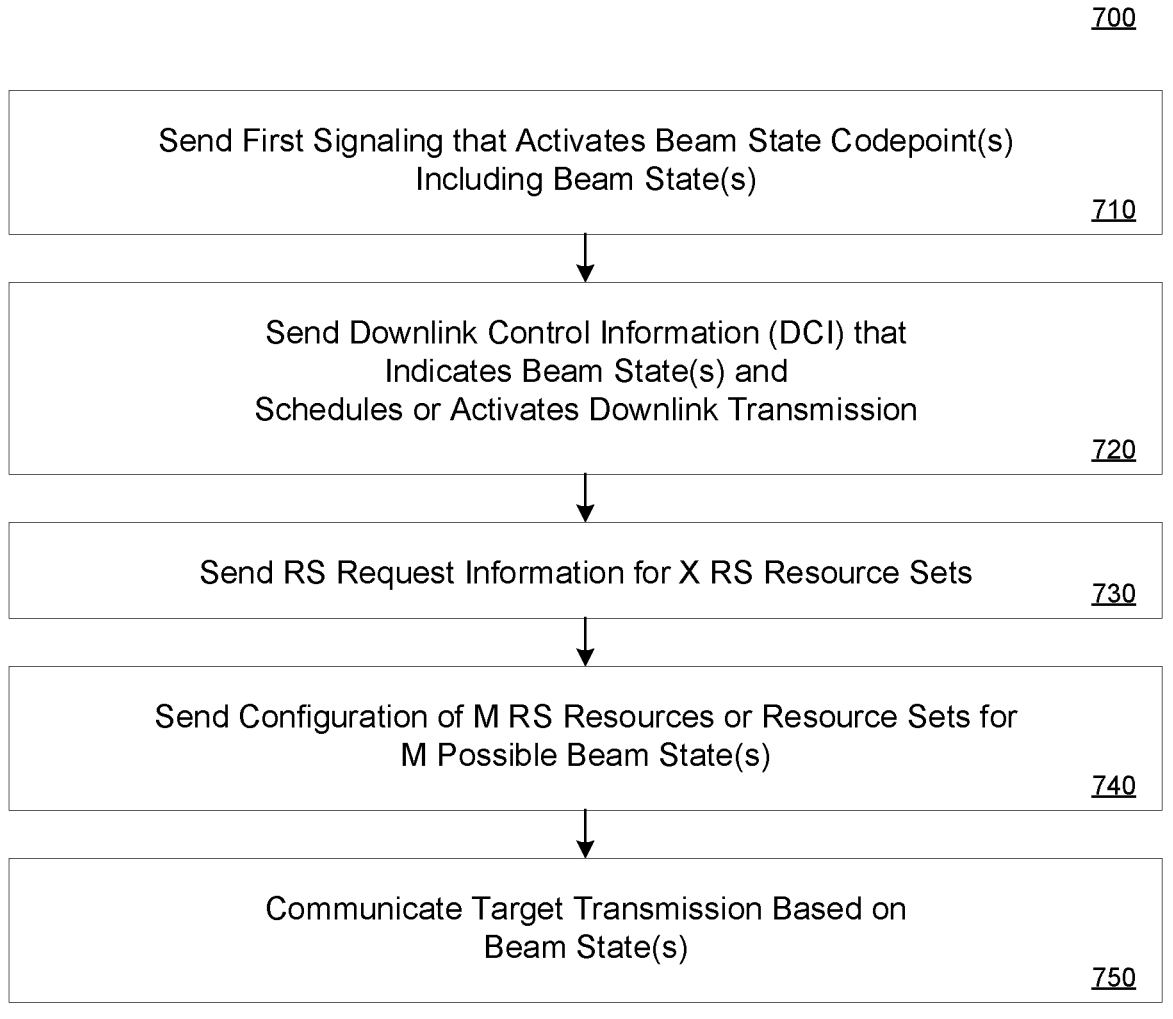

700

Send First Signaling that Activates Beam State Codepoint(s)
Including Beam State(s)

710

Send Downlink Control Information (DCI) that
Indicates Beam State(s) and
Schedules or Activates Downlink Transmission

720

Send RS Request Information for X RS Resource Sets

730

Send Configuration of M RS Resources or Resource Sets for
M Possible Beam State(s)

740

Communicate Target Transmission Based on
Beam State(s)

METHOD AND SYSTEM FOR APPLYING A UNIFIED TRANSMISSION CONFIGURATION INDICATOR (TCI) STATE TO A TARGET SIGNAL

CROSS-REFERENCE TO RELATED APPLICATION

This application claims the benefit of priority under 35 U.S.C. § 120 as a continuation of International Patent Application No. PCT/CN2021/085367, filed on Apr. 2, 2021, the disclosure of which is incorporated herein by reference in its entirety.

TECHNICAL FIELD

The present implementations relate generally to wireless communications, and more particularly to applying a unified transmission configuration indicator to a target signal.

BACKGROUND

One of the key features of the new radio (NR) technology of fifth generation (5G) mobile communication systems is the support of high frequency bands. High frequency bands have abundant frequency domain resources, but wireless signals in high frequency bands decay quickly and coverage of the wireless signals becomes small. Thus, a flexible beam update mechanism is desired.

SUMMARY

The example arrangements disclosed herein are directed to solving the issues relating to one or more of the problems presented in the prior art, as well as providing additional features that will become readily apparent by reference to the following detailed description when taken in conjunction with the accompany drawings. In accordance with various arrangements, example systems, methods, devices and computer program products are disclosed herein. It is understood, however, that these arrangements are presented by way of example and are not limiting, and it will be apparent to those of ordinary skill in the art who read the present disclosure that various modifications to the disclosed arrangements can be made while remaining within the scope of this disclosure.

Transmitting signals in a beam mode can concentrate energy in a relatively small spatial range and improve coverage of wireless signals in high frequency bands. In the beam scenario, as the time and position change, a beam pair between a base station (BS) and a user equipment (UE) may also change.

Example implementations include a wireless communication method of receiving, by a wireless communication device from a network, first signaling, wherein the first signaling activates one or more beam state codepoints, each of the one or more beam state codepoints comprises one or more beam states, determining, by the wireless communication device, at least one beam state according to the one or more beam state codepoints, and applying, by the wireless communication device, the at least one beam state to a target transmission. It is to be understood that codepoints can correspond to one or more beam states.

Example implementations also include a method where the first signaling comprises a Medium Access Control (MAC) Control Element (CE).

Example implementations also include a method where one of: the at least one beam state comprises a downlink (also called downlink-only) beam state, the target transmission comprises a downlink transmission, the downlink-only beam state is applied to the downlink transmission, the at least one beam state comprises an uplink (also called uplink-only) beam state, the target transmission comprises an uplink transmission, the uplink-only beam state is applied to the uplink transmission, or the at least one beam state comprises a downlink and uplink beam state, the target transmission comprises a downlink transmission and an uplink transmission, the downlink and uplink beam state is applied to the downlink transmission and the uplink transmission.

Example implementations also include a method where determining the at least one beam state according to the one or more beam state codepoints comprises at least one of: determining the at least one beam state according to one beam state codepoint activated by the first signaling, wherein number of the one or more beam state codepoints is 1, or, determining the at least one beam state according to at least one beam state codepoint indicated by second signaling.

Example implementations also include a method where each beam state of the one or more beam states or of the at least one beam state comprises at least one of: a Quasi Co-Location (QCL) information, a Transmission Configuration Indicator (TCI) state, spatial relation information, reference signal information, spatial filter information, or precoding information.

Example implementations also include a method where each beam state in the beam state set is associated with or corresponds to one RS resource or RS resource set and each beam state in the beam state set is applied to a corresponding RS resource, a corresponding RS resource set, or all RS resources in the corresponding RS resource set.

Example implementations also include a method where a RS resource in the at least one RS resource comprises Channel State Information Reference Signal (CSI-RS) resource or Sounding Reference Signal (SRS) resource, or a RS resource set in the at least one RS resource set comprise CSI-RS resource set or SRS resource set.

Example implementations also include a method including receiving, by the wireless communication device, configuration of M RS resources or RS resource sets corresponding to M possible beam states in a beam state set respectively, wherein M is an integer.

Example implementations also include a method where M is a maximum number of beam states in the beam state set sent by the network.

Example implementations also include a method where each beam state in the beam state set is associated with or corresponds to one of the MRS resources or RS resource sets.

Example implementations also include a method where an association between a beam state in the beam state set and a RS resource set is determined according to at least one of: an order of the beam states in the beam state set, an index of each of the RS resource sets, a usage of the RS resource set, an order of the RS resource set ID among one or more RS resource set with certain usage, or information associating the RS resource set with the beam state set.

Example implementations also include a method where an association between a beam state in the beam state set and a RS resource is determined according to at least one of: an order of the beam states in the beam state set, an index of each of the RS resource, an index of the RS resource set to which the RS resource belongs, a usage of the RS resource set to which the RS resource belong, or information associating the RS resource or the RS resource set to which the RS resource belongs with the beam state set.

Example implementations also include a method where the usage of the RS resource set is at least one of Channel State Information (CSI) acquisition, tracking, codebook, non-codebook, or antenna switching.

Example implementations also include a method where communicating, by the wireless communication device, N RS resources from the M RS resources or N RS resource sets from the M RS resource sets, wherein each of the N RS resources or N RS resource sets corresponding to each of the beam state in the beam state set, wherein M or N is an integer.

Example implementations also include a method where N is determined according to a number of beam states in the beam state set, and wherein the N RS resource sets are determined according to the first NRS resource sets from MRS resource sets.

Example implementations also include a method including receiving, by the wireless communication device, RS request information, corresponding to X RS resource sets, communicating, by the wireless communication device, the target transmission according to at least one of the RS request information or the beam state set, where X is an integer.

Example implementations also include a method where the communicating, by the wireless communication device, the target transmission which is a RS transmission according to at least one of the RS request information and the beam state set comprises communicating, by the wireless communication device, the target transmission according to Y RS resource sets from X RS resource sets, wherein each of the Y RS resource sets corresponding to one of the beam state in the beam state set, wherein X and Y are integers.

Example implementations also include a method where Y is determined according to a number of beam states in the beam state set, and wherein the Y RS resource sets are determined according to first Y RS resource sets from X RS resource sets.

Example implementations also include a method where a RS resource set in the X RS resource sets is associated with an order or an index of a beam state in the beam state set, and the order or the index is larger than a number of beam states in the beam state set, the RS resource set is not communicated by the wireless communication device.

Example implementations also include a method where the RS request information and the at least one beam state are indicated in the same signaling.

Example implementations also include a method where the beam state set is indicated by a Downlink Control Information (DCI) with downlink assignment or uplink grant, the beam state set is applied to the target transmission starting from or after a time period after the reception of the DCI.

Example implementations also include a method where the beam state set is indicated by a Medium Access Control (MAC) Control Element (CE), the beam state set is applied to the target transmission start from or after a time period after an acknowledgement for the MAC CE.

Example implementations also include a method where the beam state set is indicated by a Downlink Control Information (DCI) without downlink assignment or uplink grant, the beam state set is applied to the target transmission starting from or after a time period after an acknowledgement for DCI.

Example implementations also include a method including receiving Downlink Control Information (DCI), where the DCI indicates the at least one beam state and schedules or activates a downlink transmission, and where a time offset between reception of the DCI and the downlink transmission is less than a threshold, the method further comprising determining, by the wireless communication device, that Demodulation Reference Signal (DMRS) ports of the downlink transmission are quasi co-located with the Reference Signal (RS) with respect to a currently effective beam state for the downlink transmission.

Example implementations also include a wireless communication method of sending, by a network to a wireless communication device, first signaling, wherein the first signaling activates at least one beam state codepoint, each of the at least one beam state codepoint comprises one or more beam states, the at least one beam state codepoint corresponds to at least one beam state according to the at least one beam state codepoint, and communicating, by network with the wireless communication device, a target transmission based on the at least one beam state.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 6 illustrates a first example flowchart diagram illustrating a method for applying a unified transmission configuration indicator to a target signal, in accordance with present implementations.

FIG. 7 illustrates a second example flowchart diagram illustrating a method for applying a unified transmission configuration indicator to a target signal, in accordance with present implementations.

DETAILED DESCRIPTION

Figures 1A, 1B:
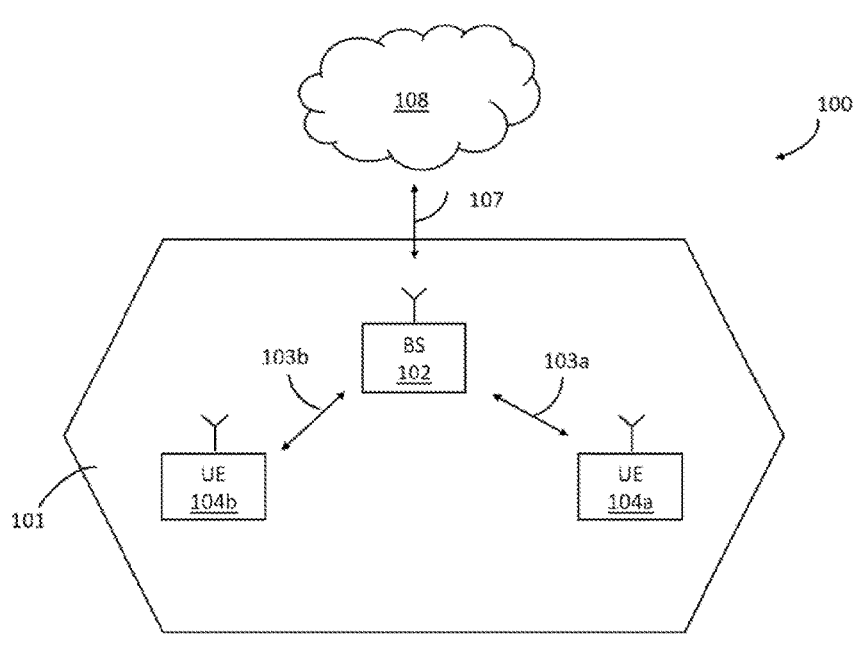
FIG. 1A is a diagram illustrating an example wireless communication network, according to various arrangements.
FIG. 1B is a diagram illustrating a block diagram of an example wireless communication system for transmitting and receiving downlink and uplink communication signals, according to various arrangements.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of inter-change of some or all of the described or illustrated ele-ments. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implemen-tations. Implementations described as being implemented in software should not be limited thereto, but can include implementations implemented in hardware, or combinations of software and hardware, and vice-versa, as will be appar-ent to those skilled in the art, unless otherwise specified herein. In the present specification, an implementation showing a singular component should not be considered limiting; rather, the present disclosure is intended to encom-pass other implementations including a plurality of the same component, and vice-versa, unless explicitly stated other-wise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

In multi-beam scenario, the best or valid beam pair between a gNodeB (gNB) and UE may vary frequently when the UE is rotating or moving fast. When a beam changes, a gNB needs to notify a UE about the updated TCI state information. In some implementations, downlink trans-mission channels include PDSCH, PDCCH, and downlink RS including CSI-RS. In some implementations, uplink transmission channels include PUSCH, PUCCH, and uplink RS including SRS. In some implementations, a gNB notifies a UE of the updated beam by a transmission channel or DL/UL RS when the beam changes. Independent beam indication for transmission channel or RS can provide flexibility which may be helpful in some cases. In some implementations, this flexibility is not necessary, because downlink side PDSCH, PDCCH and CSI-RS can share the same beam. Analogously, downlink side PDSCH, PDCCH and CSI-RS can also share the same beam. In some imple-mentations, downlink transmission shares the same beam as uplink transmission with reciprocity.

As one example, DL/UL only unified beam state is applied to DL/UL target transmission respectively. DL and UL unified beam state is applied to DL and UL target transmissions.

Therefore, in order to save overhead of a TCI state indication, a unified TCI state can be indicated to a UE for multiple DL or UL transmissions. In some implementations, a TCI can correspond to a beam state. With a unified TCI architecture, TCI state can be applied to transmissions associated with uplink and downlink, and data and control channels. The unified TCI state can be indicated in a DCI format which is used to schedule or activate a PDSCH transmission. This unified TCI state can be used for trans-missions no limited to the PDSCH transmission. In some implementations, unified TCI state can be used for at least PDCCH, PUCCH, PUSCH, CSI-RS, or SRS. As one example, a UE is configured by RRC signaling a TCI state pool. In some implementations, the TCI state pool comprises at least one TCI state, of at most 128 TCI states. In this example, a MAC CE is used from gNB to the UE to activate at least one TCI state codepoint from the TCI state pool, each of which indicates at least one TCI state from the TCI state pool. Then, in this example, a DCI format is used to select at least one TCI state from the activated TCI state according to the MAC CE. In some implementations, TCI codepoints include at most 8 TCI state codepoints. In some implementations, the TCI state pool includes at most 1 TCI state in the case of STRP, and at most 2 TCI states in the case of MTRP. The DCI format can include a TCI state field which indicates a value corresponds to a TCI codepoint with one or more TCI states activated by MAC CE. The unified TCI state can be applied to the multiple transmissions after a time period after the DCI format or after a time period after a HARQ-ACK of the DCI format which indicates the unified TCI state. As one example, DCI format, such as DCI format 1_1 or 1_2, schedules a PDSCH transmission. As another example, a DCI format such as DCI format 0_1 or 0_2, schedules a PUSCH transmission. It is to be understood that a time period can be a threshold value configured by higher layer signaling, i.e. RRC signaling. It is to be understood that an acknowledgement can correspond to HARQ-ACK.

In some implementations, TCI state comprises at least one of: a quasi co-location (QCL) information, a transmission configuration indicator (TCI) state, spatial relation informa-tion, reference signal information, spatial filter information, and precoding information.

Unified TCI state can be directly indicated or activated from MAC CE. The unified TCI state can also be indicated or activated by a MAC CE when a TCI state field is absent in DCI. The unified TCI state can be applied to the multiple transmissions after a time period after a HARQ-ACK of the MAC CE which indicates or activates the unified TCI state. As one example, a UE is configured by RRC signaling a TCI state pool which comprises at least one TCI state, and a MAC CE is used from gNB to the UE to activate one TCI state codepoint which indicates at least one TCI state from the TCI state pool, e.g. at most 1 TCI state in the case of STRP, and at most 2 TCI states in the case of MTRP. In some implementations, at least one TCI stats includes at most 128 TCI states. A TCI state codepoint may comprise at least one TCI state.

A unified TCI state can be applied to an SRS resource set. A unified TCI state can be applied to an SRS resource set. When a unified TCI state is applied to an SRS resource set, the unified TCI state is applied to all of the SRS resources in the SRS resource set. When a TCI state is applied to an SRS resource set, the UE determines transmit parameters for each SRS resource in the SRS resource set according to the TCI state. It can be understood that all SRS resources can share a same transmit beam, or the transmit beams for the SRS resources can be different but are QCL-ed (quasi-co-location).

A set of one or more activated TCI states can be applied to RS for CSI acquisition. In some implementations, CSI acquisition can be or correspond to CSI computation. In some implementations, TCI states can be activated by MAC CE. A unified TCI state can be applied to at least one of PDCCH, PDSCH, and CSI-RS in downlink, and applied to PUCCH, PUSCH, SRS in uplink. For PDCCH, PDSCH, PUCCH, and PUSCH, which are transmit channels, a uni-fied TCI state can provide a specific beam for control information transmission and data transmission. For CSI-RS and SRS, a unified TCI state can confine beam range of the RS transmission. Without unified TCI state method, CSI-RS and SRS can be transmitted on a variety of beams which can provide channel estimations of multiple beams. Once a beam changes within a set of beams, e.g. active TCI state set, the channel estimation for the new beam can be obtained immediately. However, with unified TCI state applied to at least one RS, there may be only one TCI state during a given time period for the at least one RS. When the beam changes, channel estimation can be obtained after a time period of the transmission of the RS with the new or updated beam corresponding to the unified TCI state.

For example, TCI state #1 corresponding to beam #1 and TCI state #2 corresponding to beam #2 are activated by a MAC CE. TCI state #2 is indicated by a DCI format which schedules a PDSCH, and is used as a unified TCI state. With unified TCI state applying to SRS, SRS only refers to TCI state #2. When the beam changes from beam #2 to beam #1, the channel estimation of the corresponding TCI state #1 has not been obtained. Note that there are different types of RS, e.g. usage for CSI acquisition (i.e. channel estimation, e.g. CSI-RS for CSI acquisition, or SRS with usage of "codebook", "non-codebook"), usage for beam management (BM), etc. The decision of beam changing may be based on at least one RS for BM, which can be transmitted or received with a variety of beams. In some implementations, beam changing with a wide variety of beams includes using a larger beam coverage area or angle. Channel estimation can be made based on a small set of RSs. As one example, channel estimation can be only based on a unified TCI state. Thus, in some implementations, there is not enough flexibility for obtaining channel estimation for new/updated beams immediately.

In order to solve the above issues of not enough flexibility, a set of activated TCI states can be applied to at least one RS. As one example, TCI states can be activated by MAC CE. As another example, activated TCI states can be applied to at least one RS for CSI acquisition. The set of activated TCI state is actually a candidate TCI state set for transmission channels. Then channel estimation can be made based on at least one RS with at least one activated TCI state. An example scheme is described in details as follows. A set of at least one activated TCI state can be applied to RS. TCI states can be activated by MAC CE. Activated TCI states can be applied to at least one RS for CSI acquisition. The RS comprises at least one of CSI-RS, or SRS. A set of activated TCI state can be applied to RS resource or RS resource set. Each of the activated TCI state can be applied to a RS resource or a RS resource set. In the case of a TCI state applied to a RS resource set, the TCI state can be applied to all RS resource(s) of the RS resource set.

A relationship between an activated TCI state and an RS resource or RS resource set can have at least one particular configuration. In some implementations, a UE is configured by RRC signaling X RS resource sets. The UE can be configured, for example, for CSI acquisition in the case of CSI-RS, or for usage of "codebook" or "non-codebook" in the case of SRS. As one example, X is an integer >=1. In some implementations, X is equal to or larger than the maximum_number of activated TCI states or activated TCI state codepoints in a MAC CE. As another example, the maximum number of beam states in the beam state set may depend on a predefined value, such as 1, 2, 8 or 16, or depend on UE capability, or depend on a configured value by the network.

In some implementations, where the maximum number of activated TCI state in a MAC CE is 4, a UE is configured at least 4 RS resource sets. Each activated TCI state corresponds to an RS resource set according to the order of TCI state in the MAC CE and the RS resource set index or identification in RRC signaling with a certain condition. The certain condition can comprise at least one of: usage for CSI acquisition, usage of tracking, usage of "codebook", usage of "non-codebook", or usage of "antenna switching." For example, for SRS, the certain condition may be usage of "codebook", or usage of "non-codebook," depending on whether PUSCH is configured as codebook-based or non-codebook based. If a UE is configured with codebook based, then the certain condition can be usage of "codebook." If a UE is configured as non-codebook based, then the certain condition can be usage of "non-codebook." As one example, tracking can be or correspond to time/frequency tracking. The relation can be shown, by way of example, as below in Table 1:

TABLE 1

| MAC CE activated | RS resource set |
|---|---|
| First activated TCI state | First RS resource set with certain condition |
| Second activated TCI state | Second RS resource set with certain condition |
| Third activated TCI state | Third RS resource set with certain condition |
| Fourth activated TCI state | Fourth RS resource set with certain condition |

In some implementations, indexing of RS resource sets is based on the order of the RS resource set ID in a BWP or a serving cell where the RS resource set is configured. For example, RS resource sets with ID 2, 3, 4, and 7 are configured with a certain condition, such as usage of "codebook", and no other RS resource set is configured with this certain condition. So, in this example, the first, second, third and fourth RS resource set with usage of "codebook" are the RS resource sets with ID 2, 3, 4, and 7 respectively.

In some implementations, indexing of activated TCI states is based on the order of TCI states in a MAC CE activating the TCI states. As one example, if 2 TCI states are activated in one TCI state codepoint, then the first one has lower index. As another example, if there are duplicated TCI states among the TCI state codepoints, only the first TCI state is indexed. Certain relationships are shown, by way of example, in Table 2:

TABLE 2

| MAC CE activated | RS resource set |
|---|---|
| codepoint #1: TCI state ID #1 | First RS resource set with certain condition |
| codepoint #2: TCI state ID #2 and #3 | Second and third RS resource set with certain condition |
| codepoint #3: TCI state ID #3 (duplicated) | none |
| codepoint #3: TCI state ID #4 | Fourth RS resource set with certain condition |

An RS resource can be configured with a reference RS based on a unified TCI state. The reference RS is used for determining spatial relation or QCL parameters for the RS resource. Once a unified TCI is indicated by a DCI format or activated by a MAC CE, the reference RS of the RS resource(s) configured with a reference RS based on a unified TCI state can be updated. When an RS resource is triggered to transmit or is expected to transmit periodically, it refers to the latest unified TCI state. The latest unified TCI state should be an effective TCI state which is after a time period after the DCI format or the MAC CE, or after a time period after a HARQ-ACK of or related to the DCI format or the MAC CE.

Optionally, a RS resource can be configured with a reference RS based on a unified TCI state and an RRC configured reference RS. When the unified TCI state is enabled, the parameter of the RS resource is determined according to the unified TCI state; otherwise the parameter of the RS resource is determined according to the RRC configured reference RS. Further optionally, a RS resource can be configured with a reference RS based on a unified TCI state. When the unified TCI state is enabled, the parameter of the RS resource is determined according to the unified TCI state; otherwise the parameter of the RS resource is determined according to the default TCI state, such as a lowest index of CORESET, etc.

An RS resource can be configured with a reference RS based on an activated TCI state, e.g. by a MAC CE. An RS resource can be configured with an index of an activated TCI state in a MAC CE. An RS resource can also or alternatively be configured with an activated TCI state in a MAC CE, where a relationship between RS resource and the activated TCI state can be decided by the following example relationships. In some implementations, an RS resource in one or more RS resource sets with certain condition is related to an activated TCI state in a MAC CE according to the order of the RS resource in the one or more RS resource sets and the order of the activated TCI state in the MAC CE. For example, there are two RS resource sets configured with a certain condition, where each RS resource set has two RS resources. When a MAC CE activates, for example, four TCI states, the relationship between activated TCI state and RS resource are shown, by way of example, as below in Table 3:

TABLE 3

| MAC CE activated | RS resource set |
|---|---|
| First activated TCI state | First RS resource in the $1^{st}$ RS resource set with certain condition |
| Second activated TCI state | Second RS resource in the $1^{st}$ RS resource set with certain condition |
| Third activated TCI state | First RS resource in the $2^{nd}$ RS resource set with certain condition |
| Fourth activated TCI state | Second RS resource in the $2^{nd}$ RS resource set with certain condition |

In some implementations, only an RS resource or RS resource set with an activated TCI is effective for transmitting or receiving. As mentioned above, in some implementations, a UE is configured by RRC signaling X RS resource sets, where X is an integer >=1. From a perspective of RRC configuration, X can be equal to or larger than the maximum number of activated TCI states or activated TCI state codepoints in a MAC CE. In some implementations, a MAC CE activates N1 TCI states, where N1 is an integer smaller than N. Then, only part of an RS resource set or RS resource can be updated with a reference RS. In this case, only the RS resource or RS resources set with the updated reference RS is actually transmitted or received when the RS resource or resource set is triggered, or is configured or indicated to be transmitted or received.

In some implementations, an RS is triggered per RS resource set. For periodic or semi-persistent RS, time domain parameters such as periodicity, starting time, including time offset, and duration are determined per RS resource set. In some implementations, all RS resources in RS resource sets are transmitted/received at the time as configured. For aperiodic RS, a list of RS resource sets configured with a resource triggering ID are triggered by a DCI format indicating the resource triggering ID. As one example, a resource triggering ID can be aperiodicSRS-ResourceTrigger. As one example, a UE receives a RS request information triggering a RS resource set which is associated with an order/index of a beam state in the beam state set, e.g. 2, which means the second beam state in the beam state set is associated with the RS resource set. The UE receives signaling indicating a beam state set and the number of beam states in the beam sate set is 1, that means the RS resource set has no new beam state for updating, then the RS resource set is not communicated by the UE. In some implementations, at least M RS resources can belong to one RS resource set or more than one RS resource set. In some implementations, N is equal to or less than M. Further, as one example, the first N RS resource sets from M RS resource sets can include the N RS resource sets with N lowest or highest RS resource set ID in the M RS resource sets. It is to be understood that M possible beam states in the beam state set means the network may indicate at most M beam states in a beam state set, but a beam state set does not always include M beam states, sometimes the number of the beam states in a beam state set is smaller than M. It is to be further understood that each of M possible beam states can be associated with one RS resource set.

As one example, the following RS resource sets are configured with resource triggering IDs as: RS resource set #1 with resource triggering ID=1, RS resource set #2 with resource triggering ID=1, RS resource set #3 with resource triggering ID=1, RS resource set #4 with resource triggering ID=1, RS resource set #5 with resource triggering ID=2, and RS resource set #6 with resource triggering ID=2. A DCI indicating an RS request field with a value of 1 may trigger RS transmission of RS resource set #1, #2, #3 and #4, and a DCI indicating a RS request field with a value of 2 may trigger RS transmission of RS resource set #5 and #6. In this example, RS resource set #1, #2, #3 and #4 are configured with an activated TCI state. As one example, the TCI state is activated by MAC CE. If the MAC CE activates four TCI states, the reference RS of the RS resources in the RS resource set #1, #2, #3 and #4 are updated to the four activated TCI states accordingly. A DCI indicating an RS request field with a value of 1 triggers RS transmission of RS resource set #1, #2, #3 and #4.

FIG. 1A shows an example wireless communication network 100. The wireless communication network 100 corresponds to a group communication within a cellular network. In the wireless communication network 100, a network side communication node or a base station (BS) can include one or more of a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system (such as but not limited to, a mobile device, a smart phone, a Personal Digital Assistant (PDA), a tablet, a laptop computer) or a short range communication system (such as but not limited to, a wearable device, a vehicle with a vehicular communication system, or the like). As In FIG. 1A, a network side communication node is represented by a BS 102, and a terminal side communication node is represented by a UE 104a or 104b. In some arrangements, the BS 102 is sometimes referred to as a "wireless communication node," and the UE 104a/104b is sometimes referred to as a "wireless communication device."

As shown in FIG. 1A, the BS 102 can provide wireless communication services to the UEs 104a and 104b within a cell 101. The UE 104a can communicate with the BS 102 via a communication channel 103a. Similarly, the UE 104b can communicate with the BS 102 via a communication channel 103b. The communication channels (e.g., 103a and 103b) can be through interfaces such as but not limited to, an Uu interface which is also known as Universal Mobile Tele-communication System (UMTS) air interface. The BS 102 is connected to a Core Network (CN) 108 through an external interface 107, e.g., an Iu interface.

FIG. 1B illustrates a block diagram of an example wire-less communication system 150 for transmitting and receiv-ing downlink and uplink communication signals, in accor-dance with some arrangements of the present disclosure. Referring to FIGS. 1A and 1B, in the system 150, data symbols can be transmitted and received in a wireless communication environment such as the wireless commu-nication network 100 of FIG. 1A.

The system 150 generally includes the BS 102 and UEs 104a and 104b. The BS 102 includes a BS transceiver module 110, a BS antenna 112, a BS memory module 116, a BS processor module 114, and a network communication module 118. The modules/components are coupled and interconnected with one another as needed via a data com-munication bus 120. The UE 104a includes a UE transceiver module 130a, a UE antenna 132a, a UE memory module 134a, and a UE processor module 136a. The modules/ components are coupled and interconnected with one another as needed via a data communication bus 140a. Similarly, the UE 104b includes a UE transceiver module 130b, a UE antenna 132b, a UE memory module 134b, and a UE processor module 136b. The modules/components are coupled and interconnected with one another as needed via a data communication bus 140b. The BS 102 communicates with the UEs 104a and 104b via communication channels 155, which can be any wireless channel or other medium known in the art suitable for transmission of data as described herein.

The system 150 can further include any number of modules/elements other than the modules/elements shown in FIG. 1B. The various illustrative blocks, modules, ele-ments, circuits, and processing logic described in connection with the arrangements disclosed herein can be implemented in hardware, computer-readable software, firmware, or any practical combination thereof. To clearly illustrate this inter-changeability and compatibility of hardware, firmware, and software, various illustrative components, blocks, modules, circuits, and steps are described generally in terms of their functionalities. Whether such functionalities are imple-mented as hardware, firmware, or software depends upon the particular application and design constraints imposed on the overall system. Those familiar with the concepts described herein may implement such functionalities in a suitable manner for each particular application, but such implemen-tation decisions should not be interpreted as limiting the scope of the present disclosure.

A wireless transmission from an antenna of each of the UEs 104a and 104b to an antenna of the BS 102 is known as an uplink transmission, and a wireless transmission from an antenna of the BS 102 to an antenna of each of the UEs 104a and 104b is known as a downlink transmission. In accordance with some arrangements, each of the UE trans-ceiver modules 130a and 130b may be referred to herein as an uplink transceiver, or UE transceiver. The uplink trans-ceiver can include a transmitter circuitry and receiver cir-cuitry that are each coupled to the respective antenna 132a and 132b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF trans-mitter circuitry and receiver circuitry that are each coupled to the antenna 112. A downlink duplex switch may alterna-tively couple the downlink transmitter or receiver to the antenna 112 in time duplex fashion. The operations of the transceivers 110, 130a, and 130b are coordinated in time such that the uplink receiver is coupled to the antenna 132a and 132b for reception of transmissions over the wireless communication channels 155 at the same time that the downlink transmitter is coupled to the antenna 112. In some arrangements, the UEs 104a and 104b can use the UE transceivers 130a and 130b through the respective antennas 132a and 132b to communicate with the BS 102 via the wireless communication channels 155. The wireless com-munication channel 155 can be any wireless channel or other medium suitable for downlink (DL) and/or uplink (UL) transmission of data as described herein. It is to be under-stood that a downlink transmission can correspond to PDSCH.

The UE transceiver 130a/130b and the BS transceiver 110 are configured to communicate via the wireless data com-munication channel 155, and cooperate with a suitably configured antenna arrangement that can support a particular wireless communication protocol and modulation scheme. In some arrangements, the UE transceiver 130a/130b and the BS transceiver 110 are configured to support industry standards such as the Long Term Evolution (LTE) and emerging 5G standards, or the like. It is understood, how-ever, that the present disclosure is not necessarily limited in application to a particular standard and associated protocols. Rather, the UE transceiver 130a/130b and the BS transceiver 110 may be configured to support alternate, or additional, wireless data communication protocols, including future standards or variations thereof.

The processor modules 136a and 136b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to per-form the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, methods or algorithms described in connec-tion with the arrangements disclosed herein may be embod-ied directly in hardware, in firmware, in a software module executed by processor modules 114, 136a, and 136b, respec-tively, or in any practical combination thereof. The memory modules 116, 134a, 134b can be realized as RAM memory, flash memory, ROM memory, EPROM memory, EEPROM memory, registers, a hard disk, a removable disk, a CD-ROM, or another suitable form of storage medium. In this regard, the memory modules 116, 134a, and 134b may be coupled to the processor modules 114, 136a, and 136b, respectively, such that the processors modules 114, 136a, and 136b can read information from, and write information to, the memory modules 116, 134a, and 134b, respectively. The memory modules 116, 134a, and 134b may also be integrated into their respective processor modules 114, 136a, and 136b. In some arrangements, the memory modules 116, 134a, and 134b may each include a cache memory for storing temporary variables or other intermediate information during execution of instructions to be executed by processor modules 114, 136a, and 136b, respectively. Memory modules 116, 134a, and 134b may also each include non-volatile memory for storing instructions to be executed by the processor modules 114, 136a, and 136b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

The BS 102 can communicate with a plurality of UEs (including the UEs 104a and 104b) using multicast or broadcast, collectively referred to as MBS. The plurality of UEs can each receive MBS channel (e.g., MBS PDSCH, MBS PDCCH, and so on) via multicast and/or broadcast. In order to receive the MBS channel, the plurality of UEs have a common understanding on the configurations of the MBS channel, including but not limited to, frequency resource range for resource allocation, scramble identifier (ID), and so on.

In some implementations of the wireless communication network 100 and the wireless communication system 150, for multicast of Radio Resource Control (RRC)-CONNECTED UEs, a common frequency resource for group-common PDCCH/PDSCH is confined within the frequency resource of a dedicated unicast Bandwidth Part (BWP) to support simultaneous reception of unicast and multicast in the same slot. Two options can be used for the common frequency resource for group-common PDCCH/PDSCH. In a first option, the common frequency resource is defined as an MBS-specific BWP, which is associated with the dedicated unicast BWP and using the same numerology (e.g., Subcarrier Spacing (SCS) and Cyclic Prefix (CP)). Accordingly, BWP switching is needed between the multicast reception in the MBS-specific BWP and unicast reception in its associated dedicated BWP.

In a second option, the common frequency resource is defined as an "MBS frequency region" with a number of contiguous PRBs, which is configured within the dedicated unicast BWP. The starting PRB and the length of PRBs of the MBS frequency region are indicated using a suitable mechanism. In the second option, a MBS BWP is used for MBS transmission, which is associated to unicast BWP. MBS BWP and unicast BWP can be used for the MBS PDSCH and unicast PDSCH transmission, which need simultaneous activation of two BWPs. The arrangements disclosed herein relate to managing the operations of two active BWPs.

As used herein, BWP refers to a portion of contiguous frequency resource in a cell. In other words, a BWP is a continuous range of frequencies that can be used for communications between a BS and UEs. Some transmission parameters and channel configurations are BWP-specific. Different UEs can have different BWP configurations. In one implementation, at most one of multiple configured BWPs can be activated due to lack of time, although at most four BWPs can be configured for a UE. In other words, for a UE, at most one active DL BWP and at most one active UL BWP at a given time can be activated for a given serving cell.

Figure 2:
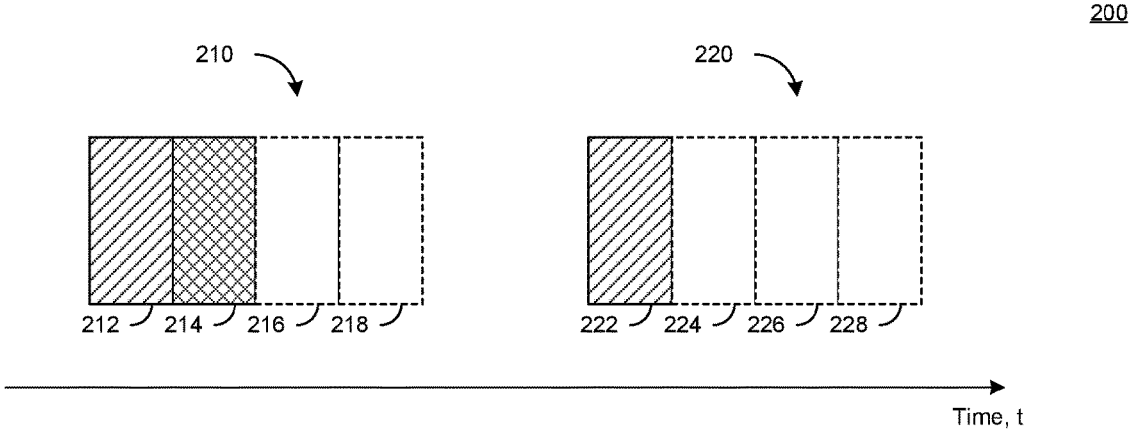
FIG. 2 illustrates a first example system for applying a unified transmission configuration indicator to a target signal, in accordance with present implementations.

FIG. 2 illustrates a first example system for applying a unified transmission configuration indicator to a target signal, in accordance with present implementations. As illustrated by way of example in FIG. 2, an example system 200 includes a first RS resource set 210 and a second RS resource set 220. In some implementations, the first RS resource set 210 includes a first RS resource 212, a second RS resource 214, a third RS resource 216, and a fourth RS resource 218. In some implementations, the second RS resource set 220 includes a first RS resource 222, a second RS resource 224, a third RS resource 226, and a fourth RS resource 228. In some implementations, the first RS resources 212 and 222 include a first TCI state. In some implementations, the second RS resource 212 includes a second TCI state.

In another example, as shown in FIG. 2, RS resource sets 210 and 220 are configured with activated TCI state, e.g. in MAC CE. If the MAC CE activates two TCI states, the reference RS of the RS resources in the RS resource set 210 and 220 are updated to the two activated TCI states accordingly. A DCI indicating a RS request field with a value of 1 triggers RS transmission of RS resource set 210 and 220. And if the MAC CE activates one TCI state, the reference RS of the RS resources in the RS resource set 210 are updated to the one activated TCI states accordingly. A DCI indicating a RS request field with a value of 1 triggers RS transmission of RS resource set 210.

If only part of the RS resources in a RS resource set are updated to the activated TCI states, only the RS resource with updated TCI states is transmitted or received when the RS resource set is triggered. For periodic RS resources or RS resource sets, and semi-persistent RS resources or RS resource sets, only the RS resource or RS resource set with updated TCI states is transmitted or received at the time corresponding to the RS resource or RS resource set according to the configuration and/or indication for the RS resource or RS resource set.

Figure 3:
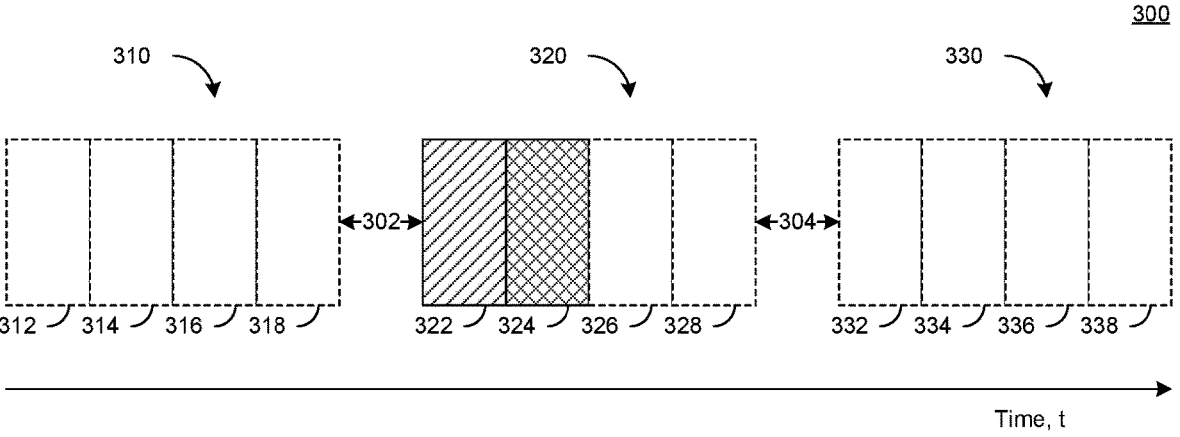
FIG. 3 illustrates a second example system for applying a unified transmission configuration indicator to a target signal, in accordance with present implementations.

FIG. 3 illustrates a second example system for applying a unified transmission configuration indicator to a target signal, in accordance with present implementations. As illustrated by way of example in FIG. 3, an example system 300 includes a first RS resource set 310, a second S resource set 320, and a third RS resource set 330. In some implementations, the first RS resource set 310 includes a first RS resource 312, a second RS resource 314, a third RS resource 316, and a fourth RS resource 318. In some implementations, the second RS resource set 320 includes a first RS resource 322, a second RS resource 324, a third RS resource 326, and a fourth RS resource 328. In some implementations, the first RS resource 322 includes a first TCI state. In some implementations, the second RS resource 324 includes a second TCI state. In some implementations, the first RS resource set 310 and the second RS resource set 320 are separated by a first period 302. In some implementations, the second RS resource set 320 and the third RS resource set 330 are separated by a second period 304. In some implementations, the first period 302 and the second period 304 are substantially equal in length.

As shown by way of example in FIG. 3, a MAC CE activates two TCI states, and the corresponding RS resources 322 and 324 are transmitted or received in next RS resource occasion with time period of P. In some implementations, when a MAC CE activates TCI states, it affects K occasions for the RS resource with the updated or activated TCI state. As one example, K is an integer and is equal to or larger than 1. FIG. 3 shows an example case for K=1. As one example, K can be determined according to UE capability and/or to gNB configuration. It is to be understood that it is also possible to send several resource or resource set cycles. It is to be further understood that one or more of the resource or resource set cycles are updated TCIs, and the rest are old TCIs to be added.

Figure 4:
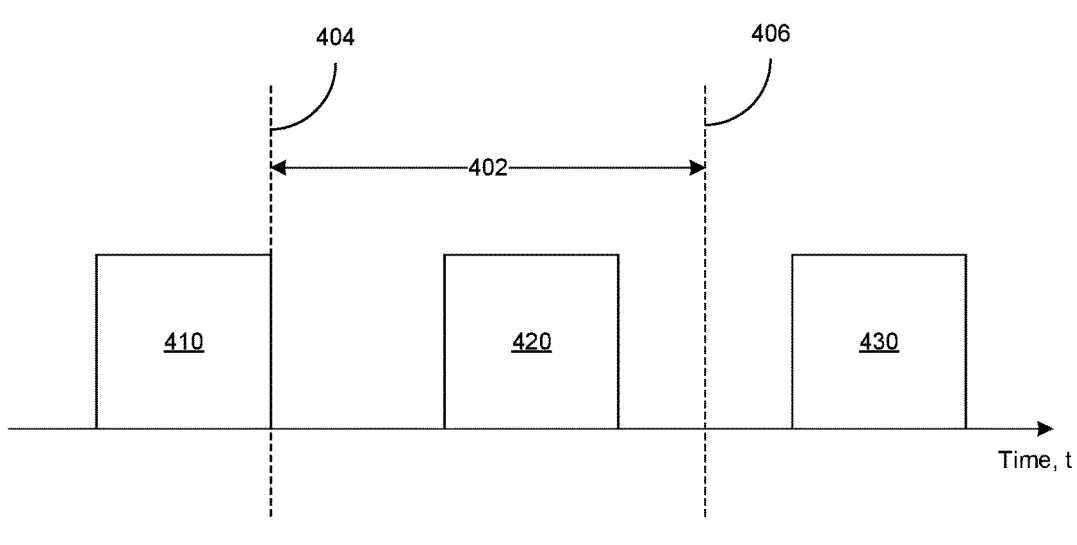
FIG. 4 illustrates a third example system for applying a unified transmission configuration indicator to a target signal, in accordance with present implementations.

FIG. 4 illustrates a third example system for applying a unified transmission configuration indicator to a target signal, in accordance with present implementations. As illustrated by way of example in FIG. 4, an example system 400 includes a TCI state 410, a first PDSCH transmission 420, and a second PDSCH transmission 430. In some implementations, the TCI state 410 includes a DCI format. In some implementations, the system 400 includes a threshold period 402 having a first threshold time 404 and a second threshold time 406.

A first example of unified application time for unified TCI state applying to all target signals. In the case of the unified TCI state indicated in a DCI format which schedules or activates a PDSCH transmission, the application time of the unified TCI state for the target signals are the same.

The TCI state in a DCI format which schedules or activates a PDSCH transmission can be applicable to the PDSCH transmission if the time offset between the reception of the DCI and the corresponding PDSCH is equal to or greater than a threshold timeDurationForQCL. In some implementations, the threshold is based on reported UE capability. Thus the unified TCI state indicated by a DCI format which schedules or activates a PDSCH transmission can be applicable to the target signal or signals other than the PDSCH transmission when or after a time period of the threshold e.g. timeDurationForQCL, after reception of the DCI. Therefore, the application time of a unified TCI state for the target signals can be determined by a time period of the threshold e.g. timeDurationForQCL, in the case of the unified TCI state indicated in a DCI format which schedules or activates a PDSCH transmission. Furthermore, the application time of a unified TCI state for the target signals can be determined as a time period of the threshold e.g. timeDurationForQCL, after reception of the DCI, in the case of the unified TCI state indicated in a DCI format which schedules or activates a PDSCH transmission.

As shown by way of example in FIG. 4, a DCI indicating a unified TCI state is applicable for a scheduled PDSCH transmission starting from or after a time period threshold after reception of the DCI. PDSCH 2 starts after a time period of threshold after reception of the DCI, so the unified TCI state can be applied to PDSCH 2. PDSCH 1 starts before a time period of threshold after reception of the DCI, so the unified TCI state is not, I this example, applicable for PDSCH 1. The target signal may comprise at least one of PDSCH, PDCCH, PUSCH, PUCCH, CSI-RS or SRS. If the unified TCI state is for DL, then the target signal may comprise at least one of PDSCH, PDCCH, or CSI-RS. If the unified TCI state is for UL, then the target signal may comprise at least one of PUSCH, PUCCH or SRS. The unified TCI state is applicable for the target signals starting or after a time period, after reception of the DCI, in the case of the unified TCI state indicated in a DCI format, which schedules or activates a PDSCH transmission. As one example, time period can be the threshold timeDuration-ForQCL. As another example, DCI format can be DCI format 1_1, 1_2.

Figure 5:
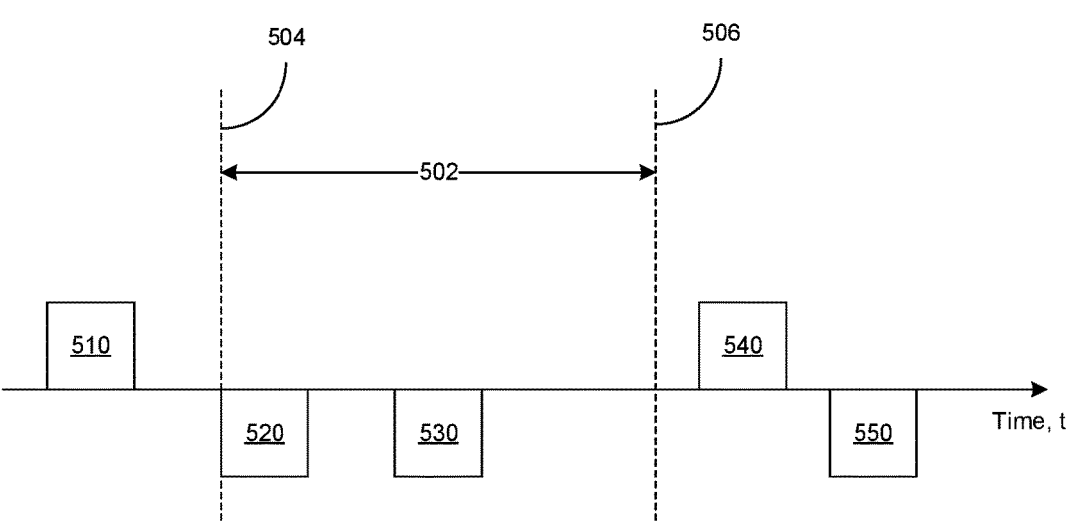
FIG. 5 illustrates a fourth example system for applying a unified transmission configuration indicator to a target signal, in accordance with present implementations.

FIG. 5 illustrates a fourth example system for applying a unified transmission configuration indicator to a target signal, in accordance with present implementations. As illustrated by way of example in FIG. 5, an example system 500 includes a TCI state 510, a response state 520, a first PUSCH transmission 530, a first PDSCH transmission 540, and a second PUSCH transmission 550. In some implementations, the system 500 includes an application period 402 having a first application time 404 and a second application time 406.

A second example of unified application time for unified TCI state applying to all target signals. In the case of the unified TCI state indicated in a DCI without scheduling information for any PDSCH or PUSCH transmission, the application time of the unified TCI state for the target signals are the same. As one example, scheduling information can be a UL grant or DL assignment. Further, the application time of a unified TCI state for the target signals is determined as starting from the first slot that is after slot $$n + x \cdot N_{slot}^{subframe,\mu},$$

or slot n+y, where μ is the SCS configuration for a PUCCH with HARQ-ACK information in slot n corresponding to the DCI, where the unified TCI state is indicated in a DCI without scheduling information. As one example, x or y is an integer equal to or greater than 0. As another example, x or y may be a predefined, a configured value, or an value indicated in the DCI. As another example, x or y may be based on reported UE capability. As one example, $$N_{slot}^{subframe,\mu}$$

is the number of slots per subframe for subcarrier spacing configuration it. As one example, Y is equal to or less than X.

As shown by way of example in FIG. 5, HARQ-ACK 520 responds to DCI 510 with unified TCI state. In some implementations, HARQ-ACK520 is in slot n, the first slot that is after slot $$n + x \cdot N_{slot}^{subframe,\mu},$$

or slot n+y, starting from time t1. The unified TCI state indicated in the DCI is not, in this example, applied to PUSCH 0 which is before t1, and is applied to PUSCH 1 and PDSCH 1 which are after t1.

In the case of the unified TCI state indicated in a MAC CE which activates at least one TCI state when TCI state field is not present in a DCI format, the application time of the unified TCI state for the target signals are the same. Further, the application time of a unified TCI state for the target signals is determined as starting from the first slot that is after $$\text{slot } n + 3N_{slot}^{subframe,\mu}$$

where $\mu$ is the SCS configuration for a PUCCH with HARQ-ACK information in slot n corresponding to the PDSCH carrying the activation command (i.e. the MAC CE which activates TCI state(s)), in the case of the unified TCI state indicated in a MAC CE which activates TCI state(s) when TCI state field is not present in a DCI format.

In some implementations, unified TCI state is used for PDSCH when time offset is less than a threshold. Without unified TCI state, if the offset between the reception of the DL DCI and the corresponding PDSCH is less than the threshold timeDurationForQCL and at least one configured TCI state for the serving cell of scheduled PDSCH contains qcl-Type set to 'typeD', the UE can assume that the DM-RS ports of PDSCH of a serving cell are quasi co-located with the RS(s) with respect to the QCL parameter(s). In some implementations, the QCL parameters are used for PDCCH quasi co-location indication of the CORESET associated with a monitored search space with the lowest controlResourceSetId in the latest slot in which one or more CORE-SETs within the active BWP of the serving cell are monitored by the UE.

In some implementations, a unified TCI state, or applying a unified TCI state to target signals is enabled. Thus, in some implementations, if the offset between the reception of the DL DCI and the corresponding PDSCH is less than the threshold timeDurationForQCL and at least one configured TCI state for the serving cell of scheduled PDSCH contains qcl-Type set to 'typeD', the TCI state indicated in the DL DCI is not effective for the target signals including the scheduled PDSCH. Thus, in some implementations, is not applicable for the scheduled PDSCH transmission by the DL DCI. As one example, the UE may determine or assume that the DM-RS ports of PDSCH of a serving cell are quasi co-located with the at least one RS with respect to one or more factors. In some implementations, the factors include the current effective unified TCI state for the target signals, if available; otherwise, the QCL parameter(s) used for PDCCH quasi co-location indication of the CORESET associated with a monitored search space with the lowest controlResourceSetId in the latest slot in which one or more CORESETs within the active BWP of the serving cell are monitored by the UE.

In some implementations, when unified TCI state, or applying unified TCI state to target signals is enabled, only the current or latest effective unified TCI state for the target signal including PDSCH, if available, is applied to PDSCH. If the current or latest effective unified TCI state for the target signal is unavailable, the QCL parameter or parameters used for PDCCH quasi co-location indication of the CORESET associated with a monitored search space with the lowest controlResourceSetId in the latest slot in which one or more CORESETs within the active BWP of the serving cell are monitored by the UE.

In some implementations, for MTRP cases, if a UE is configured with enableDefaultTCIStatePerCoresetPoolIndex and the UE is configured by higher layer parameter PDCCH-Config that contains two different values of coresetPoolIndex in different ControlResourceSets, the UE can assume that the DM-RS ports of PDSCH associated with a value of coresetPoolIndex of a serving cell are quasi co-located with the RS(s) with respect to the current or latest effective unified TCI state for the target signal including PDSCH corresponding to the coresetPoolIndex which has the same value as that configured with the PDCCH scheduling that PDSCH, if available; or, the QCL parameter(s) used for PDCCH quasi co-location indication of the CORE-SET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In some implementations, for MTRP cases, if a UE is configured with enable TwoDefaultTCI-States, and at least one TCI codepoint indicates two TCI states, the UE can assume that the DM-RS ports of PDSCH or PDSCH transmission occasions of a serving cell are quasi co-located with the RS(s) with respect to the current or latest effective unified TCI state(s) for the target signal including PDSCH, if available; or the QCL parameter(s) associated with the TCI states corresponding to the lowest codepoint among the TCI codepoints containing two different TCI states.

In some implementations, if the number of the current or latest effective unified TCI state for the target signal including PDSCH is equal to the number of the reference TCI state or states of the PDSCH transmission, the current or latest effective unified TCI states for the target signal including PDSCH is used as reference TCI state for the PDSCH. In some implementations, the UE determines transmit parameters for PDSCH based on the reference TCI states.

In some implementations, if the number of the current or latest effective unified TCI state for the target signal including PDSCH, e.g. M, is less than the number of the reference TCI state(s) of the PDSCH transmission, N, then the first M reference TCI state(s) of the PDSCH transmission is determined by the M current or latest effective unified TCI state for the target signal including PDSCH. Correspondingly, the rest of N-M reference TCI states of the PDSCH transmission are determined by the last N-M TCI states corresponding to the lowest codepoint among the TCI codepoints containing two different TCI states. As one example, if the number of the current or latest effective unified TCI state for the target signal including PDSCH, e.g. M, is greater than the number of the reference TCI state(s) of the PDSCH transmission, N, then the N reference TCI state(s) of the PDSCH transmission is determined by the first or last M current or latest effective unified TCI state for the target signal including PDSCH. It is to be understood that that a downlink transmission can correspond to a PDSCH.

FIG. 6 illustrates a first example flowchart diagram illustrating a method for applying a unified transmission configuration indicator to a target signal, in accordance with present implementations. In some implementations, a UE performs method 600 according to present implementations. In some implementations, the method 600 begins at 610.

At 610, the UE receives first signaling that activates one or more beam state codepoints. Each of the one or more beam state codepoints includes one or more beam states. In some examples, the first signaling includes a MAC CE.

The method 600 then continues to 620. At 620, the UE receives downlink control information (DCI) that indicates at least one beam state and schedules or activates a downlink transmission. The time offset between reception of the DCI and the downlink transmission is less than a threshold. At 630, the UE determines that demodulation reference signal (DMRS) ports of target signals are quasi co-located with at least one reference signal. The method 600 then continues to 640.

At 640, the UE determines at least one beam state by the one or more beam state codepoints. Each beam state of the one or more beam states or of the at least one beam state comprises at least one of: a Quasi Co-Location (QCL) information, a Transmission Configuration Indicator (TCI) state, spatial relation information, reference signal information, spatial filter information, or precoding information. In some examples, the at least one beam state includes a downlink-only beam state, the target transmission includes a downlink transmission, and the downlink-only beam state is applied to the downlink transmission. In some examples, the at least one beam state includes an uplink-only beam state, the target transmission includes an uplink transmission, and the uplink-only beam state is applied to the uplink transmission. In some examples, the at least one beam state includes a downlink and uplink beam state, the target transmission includes a downlink transmission and an uplink transmission, and the downlink and uplink beam state is applied to the downlink transmission and the uplink transmission.

In some examples, determining the at least one beam state according to the one or more beam state codepoints includes at least one of determining the at least one beam state according to one beam state codepoint activated by the first signaling (the number of the one or more beam state codepoints is 1), or determining the at least one beam state according to at least one beam state codepoint indicated by second signaling. In some implementations, determining according to one beam state codepoint indicated by first signaling is with a condition that the UE is not configured TCI present in DCI. In some implementations, determining according to one beam state codepoint indicated by second signaling is from the at least one beam state codepoint activated by the first signaling. In some implementations, second signaling corresponds to DCI.

At 650, the UE applies at least one beam state to a target transmission. At 660, the UE applies a beam state set to at least one RS resource or RS resource set. The beam state set includes the at least one beam state or the one or more beam states indicated by the one or more beam state codepoints. A RS resource in the at least one RS resource includes CSI-RS resource or SRS resource, in some examples. In other examples, a RS resource set in the at least one RS resource set includes a CSI-RS resource set or a SRS resource set. In some examples, each beam state in the beam state set is associated with or corresponds to one RS resource or RS resource set. Each beam state in the beam state set is applied to a corresponding RS resource, a corresponding RS resource set, or all RS resources in the corresponding RS resource set.

In some examples, the UE receives configuration of M RS resources or RS resource sets corresponding to M possible beam states in a beam state set respectively. M is an integer. In some examples, M is a maximum number of beam states in the beam state set sent by the network. In some examples, each beam state in the beam state set is associated with or corresponds to one of the M RS resources or RS resource sets. It is to be understood that M possible beam states in the beam state set means the network may indicate at most M beam states in a beam state set, but a beam state set does not always include M beam states, sometimes the number of the beam states in a beam state set is smaller than M. It is to be further understood that each of M possible beam states can be associated with one RS resource set. The maximum number of beam states in the beam state set may depend on one or more of a predefined value (e.g., 1, 2, 8 or 16), UE capability, a configured value configured by the network, or so on.

In some examples, an association between a beam state in the beam state set and a RS resource set, e.g. of the M RS resource sets, is determined according to at least one of an order of the beam states in the beam state set, an index of each of the RS resource sets, a usage of the RS resource set, an order of the RS resource set ID among one or more RS resource set with certain usage, or information associating the RS resource set with the beam state set. As one example, the information can be configured in or with the RS resource or the RS resource set. The information can indicate that the beam state set, i.e. the at least one unified beam state, or the at least one beam state codepoint, can be applied to/associated with the RS resource or the RS resource set. Furthermore, The information can indicate that a beam state (a non-specific beam state or a specific beam state with beam state index) in the beam state set can be applied to/associated with the RS resource or the RS resource set.

As another example, if the information indicates that a beam state (a non-specific beam state or a specific beam state with beam state index) in the beam state set can be applied to/associated with the RS resource or the RS resource set, but the beam state in the beam state set is not available, then a default beam state or a RRC configured beam state is applied to the RS resource or the RS resource set.

In some examples, an association between a beam state in the beam state set (e.g., of the M RS resource sets) and a RS resource is determined according to at least one of an order of the beam states in the beam state set, an index of each of the RS resource, an index of the RS resource set to which the RS resource belongs, a usage of the RS resource set to which the RS resource belong, or information associating the RS resource or the RS resource set to which the RS resource belongs with the beam state set. In some examples, the information can be configured in or with the RS resource or the RS resource set. The information can indicate that the beam state set (e.g., the at least one unified beam state, or the at least one beam state codepoint) can be applied to/associated with the RS resource or the RS resource set. Furthermore, the information can indicate that a beam state (e.g., a non-specific beam state or a specific beam state with beam state index) in the beam state set can be applied to/associated with the RS resource or the RS resource set. In the example in which the information indicates that a beam state (a non-specific beam state or a specific beam state with beam state index) in the beam state set can be applied to/associated with the RS resource or the RS resource set, but the beam state in the beam state set is not available, then a default beam state or a RRC configured beam state is applied to the RS resource or the RS resource set.

In some examples, the usage of the RS resource set is at least one of CSI acquisition, tracking, codebook, non-codebook, or antenna switching.

In some examples, the UE communicates N RS resources from the M RS resources or N RS resource sets from the M RS resource sets. Each of the N RS resources or N RS resource sets corresponding to each of the beam state in the beam state set. In some examples, N is determined according to a number of beam states in the beam state set, and the N RS resource sets are determined according to the first N RS resource sets from M RS resource sets.

In some examples, the beam state set is indicated by a DCI received from the BS with downlink assignment or uplink grant. The beam state set is applied to the target transmission starting from or after a time period after the reception of the DCI.

In some examples, the beam state set is indicated by a MAC CE received from the BS. The beam state set is applied to the target transmission start from or after a time period after an acknowledgement for the MAC CE.

In some examples, the beam state set is indicated by a DCI received from the BS without downlink assignment or uplink grant. The beam state set is applied to the target transmission starting from or after a time period after an acknowledgement for DCI.

At 670, the UE receives RS request information corresponding to X RS resource sets. At 680, the UE receives configuration information of M RS resources or Resource sets for M Possible beam states. The method 600 then continues to 690.

At 690, the UE communicates a target transmission by RS request information or the beam state set.

In some examples, communicating by the UE the target transmission which is a RS transmission according to at least one of the RS request information and the beam state set includes communicating, by the UE, the target transmission according to Y RS resource sets from X RS resource sets. Each of the Y RS resource sets corresponding to one of the beam state in the beam state set. X and Y are integers. Y is determined according to a number of beam states in the beam state set. The Y RS resource sets are determined according to first Y RS resource sets from X RS resource sets. In some examples, a RS resource set in the X RS resource sets is associated with an order or an index of a beam state in the beam state set, and the order or the index is larger than a number of beam states in the beam state set, the RS resource set is not communicated by the wireless communication device. The RS request information and the at least one beam state are indicated in the same signaling. In some implementations, a same signaling is a same DCI. As one example, communicating can be transmitting or receiving.

FIG. 7 illustrates a second example flowchart diagram illustrating a method for applying a unified transmission configuration indicator to a target signal, in accordance with present implementations. In some implementations, the network (e.g., a BS) performs method 700 according to present implementations. In some implementations, the method 700 begins at 710.

At 710, the BS sends first signaling that activates at least one beam state codepoint including at least one beam state. In some examples, the first signaling includes a MAC) CE. The method 700 then continues to 720.

At 720, the BS sends downlink control information (DCI) that indicates at least one beam state and schedules or activates a downlink transmission. The method 700 then continues to 730. At 730, the BS sends RS Request information for X Resource sets. The method 700 then continues to 740. At 740, the BS sends configuration of M RS Resources or Resource sets for M possible beam states.

The method 700 then continues to 750. At 750, the BS communicates a target transmission based on at least one beam state. In some implementations, the method 700 ends at 750.

In some implementations, the first Y RS resource sets from X RS resource sets can include the Y RS resource sets with X lowest or highest RS resource set ID in the X RS resource sets.

It is to be understood that communicating, by the UE, N RS resources from the M RS resources or N RS resource sets from the MRS resource sets can correspond to an aperiodic RS trigger. It is to be further understood that applying each beam state in the beam state set to a corresponding RS resource can describe a relationship between each beam state and RS resource or RS resource set, covering both possibilities. Therefore, resource and resource set can be used as alternatives. It is to be further understood that "at least one beam state" can correspond to a unified beam state, and "one or more beam states" can correspond to an activated beam state. It is to be further understood that communicating can corresponding to one or more of transmitting or receiving. It is to be further understood that RS request information can correspond to an SRS request field, or CSI request. It is to be further understood that a target transmission can correspond to an RS transmission.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A wireless communication method, comprising:
receiving, by a wireless communication device from a network, first signaling, wherein the first signaling activates one or more beam state codepoints, each of the one or more beam state codepoints comprises one or more beam states;
determining, by the wireless communication device, at least one beam state according to the one or more beam state codepoints;

applying, by the wireless communication device, the at least one beam state to a target transmission,
wherein the first signaling comprises a medium access control (MAC) control element (CE), and wherein each beam state of the one or more beam states or of the at least one beam state comprises a transmission configuration indicator (TCI) state;
wherein the target transmission comprises an RS transmission;
applying, by the wireless communication device, a beam state set to at least one Reference Signal (RS) resource or at least one RS resource set, wherein the beam state set comprises the at least one beam state or the one or more beam states indicated by the one or more beam state codepoints;
wherein
a RS resource in the at least one RS resource comprises a Channel State Information Reference Signal (CSI-RS) resource or Sounding Reference Signal (SRS) resource; or
a RS resource set in the at least one RS resource set comprise a CSI-RS resource set or a SRS resource set;
wherein each beam state in the beam state set is associated with or corresponds to one RS resource or RS resource set; and
wherein each beam state in the beam state set is applied to a corresponding RS resource, a corresponding RS resource set, or all RS resources in the corresponding RS resource set;
wherein an association between a beam state in the beam state set and a RS resource or a RS resource set is determined according to an information configured in the RS resource or the RS resource set, and the information indicates that a specific beam state with beam state index in the beam state set is applied to the associated RS resource or the associated RS resource set.

2. The method of claim 1, wherein one of:
the at least one beam state comprises a downlink beam state, the target transmission comprises a downlink transmission, and the downlink beam state is applied to the downlink transmission;
the at least one beam state comprises an uplink beam state, the target transmission comprises an uplink transmission, and the uplink-only beam state is applied to the uplink transmission; or
the at least one beam state comprises a downlink and uplink beam state, the target transmission comprises a downlink transmission and an uplink transmission, and the downlink and uplink beam state is applied to the downlink transmission and the uplink transmission.

3. The method of claim 1, wherein determining the at least one beam state according to the one or more beam state codepoints comprises at least one of:
determining the at least one beam state according to one beam state codepoint activated by the first signaling, wherein a number of the one or more beam state codepoints is 1, or
determining the at least one beam state according to at least one beam state codepoint indicated by second signaling.

4. The method of claim 1, wherein:
a RS resource is configured with an index of an activated TCI state in the MAC CE.

5. The method of claim 1, wherein:

an association between a beam state in the beam state set and a RS resource set is determined according to at least one of:

an order of the beam states in the beam state set;

an index of each of the RS resource sets;

a usage of the RS resource set;

an order of the RS resource set identifier (ID) among one or more RS resource set with certain usage; or information associating the RS resource set with the beam state set.

6. The method of claim 1, wherein an association between a beam state in the beam state set and a RS resource is determined according to at least one of:

an order of the beam states in the beam state set;

an index of each of the RS resource;

an index of the RS resource set to which the RS resource belongs;

a usage of the RS resource set to which the RS resource belong; or information associating the RS resource or the RS resource set to which the RS resource belongs with the beam state set.

7. The method of claim 5, wherein:

the usage of the RS resource set is at least one of Channel State Information (CSI) acquisition, tracking, codebook, non-codebook, or antenna switching.

8. The method of claim 5, wherein communicating, by the wireless communication device, N RS resources from the MRS resources or N RS resource sets from the MRS resource sets, wherein each of the N RS resources or N RS resource sets corresponding to each of the beam state in the beam state set, wherein M or Nis integer.

9. The method of claim 8, wherein Nis determined according to a number of beam states in the beam state set, and wherein the N RS resource sets are determined according to the first NRS resource sets from M RS resource sets.

10. The method of claim 1, further comprising:

receiving, by the wireless communication device, RS request information, corresponding to X RS resource sets;

communicating, by the wireless communication device, the target transmission according to at least one of the RS request information or the beam state set.

11. A wireless communication method, comprising:

sending, by a network to a wireless communication device, first signaling, wherein the first signaling activates at least one beam state codepoint, each of the at least one beam state codepoint comprises one or more beam states, the at least one beam state codepoint corresponds to at least one beam state according to the at least one beam state codepoint;

communicating, by the network with the wireless communication device, a target transmission based on the at least one beam state, wherein the first signaling comprises a medium access control (MAC) control element (CE), and wherein each beam state of the one or more beam states or of the at least one beam state comprises a transmission configuration indicator (TCI) state;

wherein the target transmission comprises an RS transmission;

wherein the wireless communication device applies a beam state set to at least one Reference Signal (RS) resource or at least one RS resource set, wherein the beam state set comprises the at least one beam state or the one or more beam states indicated by the one or more beam state codepoints;

wherein a RS resource in the at least one RS resource comprises a Channel State Information Reference Signal (CSI-RS) resource or Sounding Reference Signal (SRS) resource; or a RS resource set in the at least one RS resource set comprise a CSI-RS resource set or a SRS resource set;

wherein each beam state in the beam state set is associated with or corresponds to one RS resource or RS resource set; and wherein each beam state in the beam state set is applied to a corresponding RS resource, a corresponding RS resource set, or all RS resources in the corresponding RS resource set;

wherein an association between a beam state in the beam state set and a RS resource or a RS resource set is determined according to an information configured in the RS resource or the RS resource set, and the information indicates that a specific beam state with beam state index in the beam state set is applied to the associated RS resource or the associated RS resource set.

12. A wireless communication device, comprising:

at least one processor configured to:

receive, via a receiver from a network, first signaling, wherein the first signaling activates one or more beam state codepoints, each of the one or more beam state codepoints comprises one or more beam states;

determine at least one beam state according to the one or more beam state codepoints; and apply the at least one beam state to a target transmission, wherein the first signaling comprises a medium access control (MAC) control element (CE), and wherein each beam state of the one or more beam states or of the at least one beam state comprises a transmission configuration indicator (TCI) state, wherein the target transmission comprises an RS transmission;

apply a beam state set to at least one Reference Signal (RS) resource or at least one RS resource set, wherein the beam state set comprises the at least one beam state or the one or more beam states indicated by the one or more beam state codepoints;

wherein a RS resource in the at least one RS resource comprises a Channel State Information Reference Signal (CSI-RS) resource or Sounding Reference Signal (SRS) resource; or a RS resource set in the at least one RS resource set comprise a CSI-RS resource set or a SRS resource set;

wherein each beam state in the beam state set is associated with or corresponds to one RS resource or RS resource set; and wherein each beam state in the beam state set is applied to a corresponding RS resource, a corresponding RS resource set, or all RS resources in the corresponding RS resource set;

wherein an association between a beam state in the beam state set and a RS resource or a RS resource set is determined according to an information configured in the RS resource or the RS resource set, and the information indicates that a specific beam state with beam state index in the beam state set is applied to the associated RS resource or the associated RS resource set.

13. A network node, comprising:

at least one processor configured to:

send, via a transmitter to a wireless communication device, first signaling, wherein the first signaling activates at least one beam state codepoint, each of the at least one beam state codepoint comprises one or more beam states, the at least one beam state codepoint corresponds to at least one beam state according to the at least one beam state codepoint; and communicate, via the transmitter with the wireless communication device, a target transmission based on the at least one beam state, wherein the first signaling comprises a medium access control (MAC) control element (CE), and wherein each beam state of the one or more beam states or of the at least one beam state comprises a transmission configuration indicator (TCI) state, wherein the target transmission comprises an RS transmission;

wherein the wireless communication device applies a beam state set to at least one Reference Signal (RS) resource or at least one RS resource set, wherein the beam state set comprises the at least one beam state or the one or more beam states indicated by the one or more beam state codepoints;

wherein a RS resource in the at least one RS resource comprises a Channel State Information Reference Signal (CSI-RS) resource or Sounding Reference Signal (SRS) resource; or a RS resource set in the at least one RS resource set comprise a CSI-RS resource set or a SRS resource set;

wherein each beam state in the beam state set is associated with or corresponds to one RS resource or RS resource set; and wherein each beam state in the beam state set is applied to a corresponding RS resource, a corresponding RS resource set, or all RS resources in the corresponding RS resource set;

wherein an association between a beam state in the beam state set and a RS resource or a RS resource set is determined according to an information configured in the RS resource or the RS resource set, and the information indicates that a specific beam state with beam state index in the beam state set is applied to the associated RS resource or the associated RS resource set.

\* \* \* \* \*